(12) United States Patent
Jané López

(10) Patent No.: US 11,134,692 B2
(45) Date of Patent: Oct. 5, 2021

(54) DEVICE FOR SLICING A PIG CARCASS FROM THE FRONT AND THE BACK

(71) Applicant: AIRA ROBOTICS, S. L., Cardona (ES)

(72) Inventor: Francisco Javier Jané López, Cardona (ES)

(73) Assignee: AIRA ROBOTICS, S.L., Cardona (ES)

( * ) Notice: Subject to any disclaimer, the term of this patent is extended or adjusted under 35 U.S.C. 154(b) by 0 days.

(21) Appl. No.: 16/641,531

(22) PCT Filed: Jun. 27, 2018

(86) PCT No.: PCT/ES2018/070458
§ 371 (c)(1),
(2) Date: Feb. 24, 2020

(87) PCT Pub. No.: WO2019/043276
PCT Pub. Date: Mar. 7, 2019

(65) Prior Publication Data
US 2021/0153512 A1    May 27, 2021

(30) Foreign Application Priority Data
Aug. 31, 2017    (ES) ................. ES201731057

(51) Int. Cl.
*A22B 5/00* (2006.01)
(52) U.S. Cl.
CPC .......... *A22B 5/0041* (2013.01); *A22B 5/0029* (2013.01)
(58) Field of Classification Search
CPC ............... A22B 5/0041; A22B 5/0029
(Continued)

(56) References Cited

U.S. PATENT DOCUMENTS 10,028,514 B2 * 7/2018 Driscoll ............... A22B 5/0041
2007/0275648 A1 * 11/2007 Sato ..................... A22C 17/004
452/157
(Continued)

FOREIGN PATENT DOCUMENTS

EP    494 935    7/1992
EP    1 125 501    8/2001
(Continued)

OTHER PUBLICATIONS

International Search Report and Written Opinion issued in PCT/ES2018/070458, dated Nov. 29, 2018.
(Continued)

*Primary Examiner* — Richard T Price, Jr.
(74) *Attorney, Agent, or Firm* — Ice Miller LLP

(57) ABSTRACT

The present invention relates to a device for the ventral and dorsal cutting of a pork carcass or the carcass of an already sacrificed animal with a similar corporeal structure, in a completely simultaneous manner. The device is preferably formed by two robots that are placed facing each other, with the particularity that the cut along the dorsal side includes the corner of the spine and vertebrae, while the ventral cut cuts the spine in two parts.
This device described in the invention comprises means that allow for the cutting in two practically equal halves of the body of the pig or similar animal, following the spine thereof, while the intervertebral space is cleaned of meat, in such a way that said system can perform a cut for the ventral side of the spine and a second cut for the dorsal side separating the meat from the space between the vertebrae.

20 Claims, 5 Drawing Sheets

(58) Field of Classification Search
USPC .................. 452/135, 149–152, 155, 156, 160
See application file for complete search history.

(56) References Cited

U.S. PATENT DOCUMENTS

| | | | | |
|---|---|---|---|---|
| 2009/0124186 A1* | 5/2009 | Klein | ........................ | A22B 5/20 452/152 |
| 2011/0207388 A1* | 8/2011 | Hansen | .................... | B25J 9/042 452/121 |
| 2013/0303065 A1* | 11/2013 | Ueffing | ................ | A22B 5/0023 452/156 |
| 2017/0049116 A1 | 2/2017 | Driscoll | | |

FOREIGN PATENT DOCUMENTS

| | | |
|---|---|---|
| FR | 2 923 357 | 5/2009 |
| WO | 91/04670 | 4/1991 |
| WO | 97/30594 | 8/1997 |
| WO | 03/028469 | 10/2001 |
| WO | 2018/131998 | 7/2018 |

OTHER PUBLICATIONS

International Preliminary Report on Patentability issued in PCT/ES2018/070458, dated Mar. 3, 2020.

* cited by examiner

DEVICE FOR SLICING A PIG CARCASS FROM THE FRONT AND THE BACK

CROSS-REFERENCE TO RELATED PATENT APPLICATIONS

This is a U.S. National Phase Application under 35 U.S.C. § 371 of International Patent Application No. PCT/ES2018/070458, filed Jun. 27, 2018, and claims priority to Spanish Patent Application No. P201731057, filed Aug. 31, 2017, both of which are incorporated herein by reference in their entireties. The International Application was published on Mar. 7, 2019, as International Publication No. WO 2019/043276 A1.

PURPOSE OF THE INVENTION

More specifically, the invention relates to a device for the ventral and dorsal cutting of a pork carcass or the carcass of an animal with a similar corporeal structure, in a completely simultaneous manner. The device is preferably formed by two robots that are placed facing each other, with the cut along the dorsal side including the corner of the spine and vertebrae, while the ventral cut the spine.

According to the second object of the invention, the first robot is equipped with a mixed head, which can work by supporting the cutting means of the second robot, or as a dissector for the spine, at the same time that separating the meat from the vertebrae by turning the support of the support means and the cutting means of the first robot by 180°, since the support means and the cutting means are mounted on a support which is on the last arm of the first robot.

STATE OF THE ART

There are different types of systems on the market for cutting pork carcasses and carcasses of similar animals, which can therefore be considered as state of the art, and these systems are classified according to the type of functions performed by their elements. In the first group, we could include those formed by robots or alternative cutting means that perform corner cuts of the animal's body, for example that included in the French Invention Patent no. 2,923,357 describes and claims a system comprising two robots, a first robot holding the support means of a cutting head, and on the other hand the support means of the pork ventral support device, constituting the means for moving the cutting head and the ventral support device; and a second robot holding the support means of the dorsal support device, on the other hand constituting the means for moving the dorsal support device, the two robots being placed facing each other, with respect to the plane of displacement of the carcasses and separated by a free space allowing for passage between two carcasses.

This makes reference to this same background. In a second embodiment of the invention, the system comprises a single robot, at the same time holding the support means of the cutting head, the support means of the dorsal support and the support means of the ventral support device. On the other hand, this robot constitutes the means for moving the cutting head, the dorsal support device and the ventral support device. This robot is laterally delayed in relation to the plane of displacement of the carcasses to allow their passage.

European Patent no. No. 494,935 also belongs to the state of the art, in which a method and apparatus for separating a relatively weakly structured material from a relatively robust structure using a cutting device commanded by a robot is described. This procedure and apparatus do not allow the cutting of animal carcasses, such as pork and similar.

There are therefore no known systems for cutting the animal through the spine in two, and cleaning the space between vertebrae from meat, being able to use the device in such a way that the first robot acts only as a support for the second robot; in this case the first robot acting with sensing means that hold the animal in a vertical position when the second robot acts, cutting the animal into two practically equal halves.

OBJECT OF THE INVENTION

One of the purposes of the invention is to provide a device that allows for the cutting, in practically equal halves, of the body of a pig or an animal of similar morphology that has already been sacrificed, following the spine thereof, while the intervertebral space is cleaned of meat, in such a way that said device can perform a ventral cut of the spine and a second dorsal cut consisting on separating the meat from the space between the vertebrae.

Another purpose of the invention for the first robot is to operate with only one head, but only in terms of keeping the animal placed vertically between the two robots, in a position allowing the second robot to cut the spin of the animal so dividing in two parts.

Another purpose of the invention is to replace the manual cleaning operations of the intervertebral spaces of the pork spine with a cutting operation by means of two blades, which omits the previous operation, saving time in the treatment of the slaughtered animal and, the corresponding money resulting from the substitution of a manual operation for an alternative automatic operation.

Another purpose of the invention is to reduce the maintenance costs for systems that are used in a non-simultaneous manner to cut the body of a pig or of a similar animal in two halves via its spine and the cutting of the skin and bordering tissues, regardless of whether said systems clean the intervertebral spaces; only two robots are recommended for the functioning of the device, one of them with a double function and the second always with the same function.

Another purpose of the invention is to supply the market with alternatively cut pork or parts of pork, which are adapted to the tastes of Asian consumers with other ways of consuming said products.

DESCRIPTION OF THE INVENTION

The device of the invention is defined in the first claim.

The proposed device comprises, in one of its possible embodiments, two robots arranged facing each other in front and behind of the transport carousel of the slaughtered animals, suspended by the appropriate means forming a sort of vertical plane in which:

A first robot disposed on a support incorporated into the upper arm thereof, the first robot comprising:
  means for supporting the means for cutting the spine of the animal's carcass into two, located on the second robot of the animal's carcass;
  means for immobilising the animal;
  means for cutting the skin and tissues bordering said skin; and
  means for cutting and cleaning meat from the animal in the intervertebral spaces.
A second robot, located in front of the ventral plane of the animal, comprising:

means of palpation on the ventral part of the animal, and means for cutting the spine along its central part.

The proposed device comprises, in one of its possible embodiments, two robots arranged facing each other in front and behind of the transport carousel of the slaughtered animals, suspended by the appropriate means forming a sort of vertical plane in which:

A first robot, located in front of the dorsal plane of the animal, comprising:
  means for supporting the means for cutting the spine of the animal's carcass into two, located on the second robot;
  means for dorsal cutting the skin and tissues bordering said skin;
  means for dorsal cutting and cleaning meat from the animal in the intervertebral spaces; and
  an articulated arm disposed on a support, the arm for positioning and displacing the means for dorsal cutting the skin and tissues bordering the skin and the means for dorsal cutting and cleaning meat from the animal in the intervertebral spaces.

A second robot, located in front of the ventral plane of the animal, comprising:
  means of palpation on the ventral part of the animal,
  means for cutting the spine along its central part, and
  an articulated arm for positioning and displacing the means of palpation and the means for cutting the spine.

These robots act facing each other and in a simultaneous manner, mounted on the floor or on a strong base or pedestal built on the floor of the system, and are aligned in front of and behind the carousel to transport the previously slaughtered animals. The animals are suspended from the carousel and follow a longitudinal trajectory. Their movement is interrupted when the animal is positioned in front of the two robots, and the animal's body becomes immobilised by means of lateral angled arms installed on the first robot. At this point, the two robots come into action, as detailed below.

Firstly, once the animal is immobilised by the angled arms, two tilting rollers which are incorporated into the first robots come into action. These rollers follow the morphology of the animal and prevent it from moving forward or backwards when the animal is severed. At the same time, the spine is cut and the intervertebral space is cleaned by the blades—preferably two and circular-shaped. The blades cut the skeleton, whose planes are convergent.

The convergence of the blades installed on the head incorporated into the first robot can be regulated to adapt to the morphology of the animals to be handled in a fully automatic manner.

At the same time, a blade from the first robot cuts the skin and bordering tissues, leaving clean the path for two discs located in a convergent position that act on the spine but without cutting it. The function of this blade is to separate the meat from the intervertebral spaces. Finally, another cutting disc located on the upper arm of the second robot performs the cut from top to bottom of the spine, at which time the body of the slaughtered animal is divided into two substantially equal halves, returning them so that they can be moved on by the carousel.

In an alternative embodiment, the system can perform the same process by means of a single robot instead of two robots, for which purpose the first robot equips its last arm with a support, and the means used by the first and second robots described above hang at one of the ends of the support.

All of the robots used in both of the disclosed embodiments of the invention preferably have six degrees of freedom.

Other details and characteristics will become apparent during the course of the description given below, which for illustrative purposes are represented in the figures accompanying an embodiment of the invention, which can be carried out with any type of measures and materials suitable for its purposes.

DESCRIPTION OF THE FIGURES

Below is a list of the different parts of the invention that are identified in the figures attached to this description by means of the numbers listed below, 10 cutting device, 11 first robot, 12 second robot, 13 pedestal, 14 ground plane, 15 support base, 16 support base, 17 lower arm, 18 upper arm, 19 shaft, 20 shaft, 21 arm, 22 probe cutter head, 23 probe cutter head, 24 disc, 25 probe, 26 rollers, 27 rollers, 28 pistons, 29 circular blade, 30 shaft, 31 link, 32 connecting rod, 33 connecting rod, 34 support, 35 blades, 36 arm, 37 shaft, 38 support.

DESCRIPTION OF AN EMBODIMENT OF THE INVENTION

Figure 1:
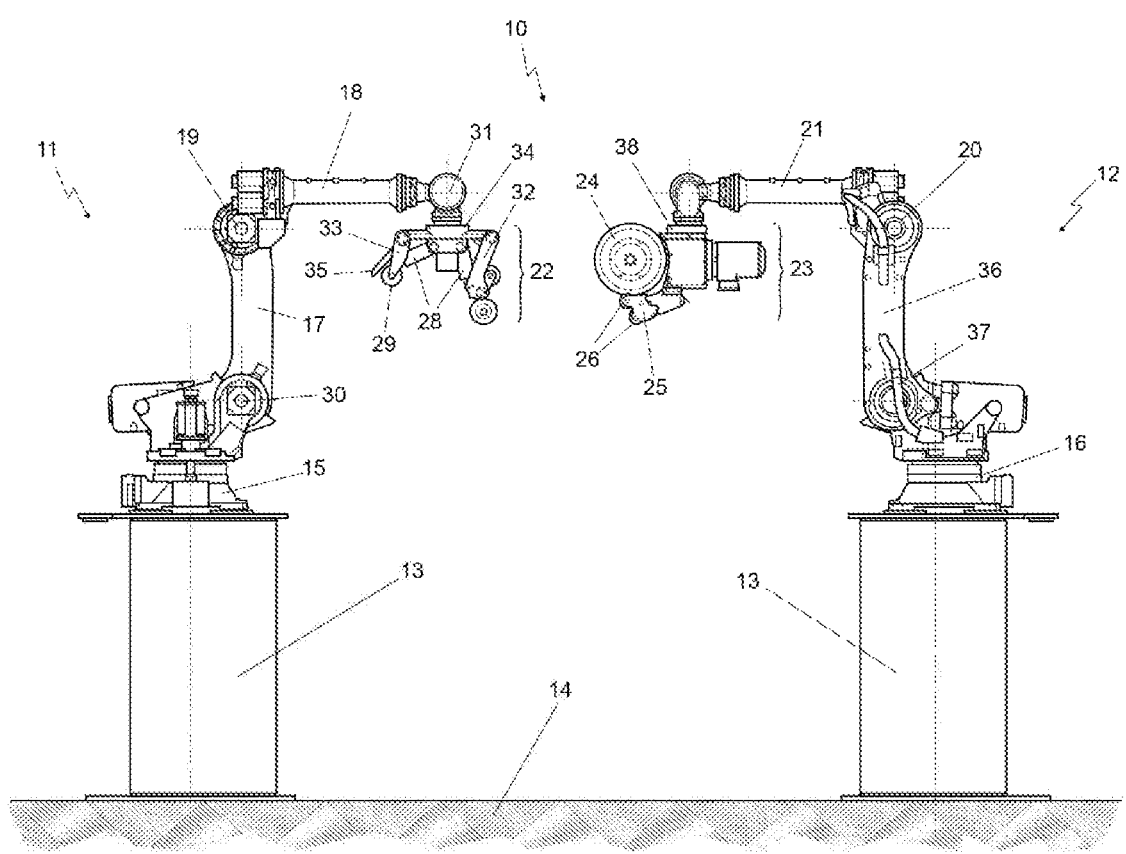
FIG. 1 shows a vertical side view of the cutting device 10 comprising two robots 11 and 12 which are facing each other and immobilised to the ground plane 14 thanks to pedestals 13.

In one of the embodiments of the invention, and as can be seen in FIG. 1, the assembly of the cutting device 10 comprises the following, mounted on a horizontal ground plane 14: two robots 11 and 12 on respective pedestals 13, which are facing each other 11 and 12 by the cutting and palpating means, leaving a space or volume between them for a carousel to circulate with the animals to be treated properly suspended by their legs and skinned.

On this pedestal, the first robot 11 comprises 13 a support base 15 and on said support base 15 there are two separate arms 17-18 angled by their respective shafts 30-19, with the following mounted on the end of the upper arm 18: a head 22 equipped with palpation and cutting means incorporated into a support 34 comprising control means that allow the programmed rotation of the support 34 making it spin and positioning either one or the other means (palpation or cutting means) according to the work assigned to the first robot 11.

The cutting means of the first robot (11) when the animal is facing the first robot 11 and its head 22 are blades 35, and a circular blade or cutting disc 29, mounted on the connecting rods 33, while the palpation or guiding means comprise probe rollers 27 mounted on the lower part of the connecting rods 32.

In this particular case shown in the figures, two pairs of probe rollers 27 are arranged, which tilt according to the dorsal morphology of the sacrificed animal via motion means that adapt to each specific animal morphology. These motion means preferably comprise connecting rods 32 and pistons 28.

Figure 2:
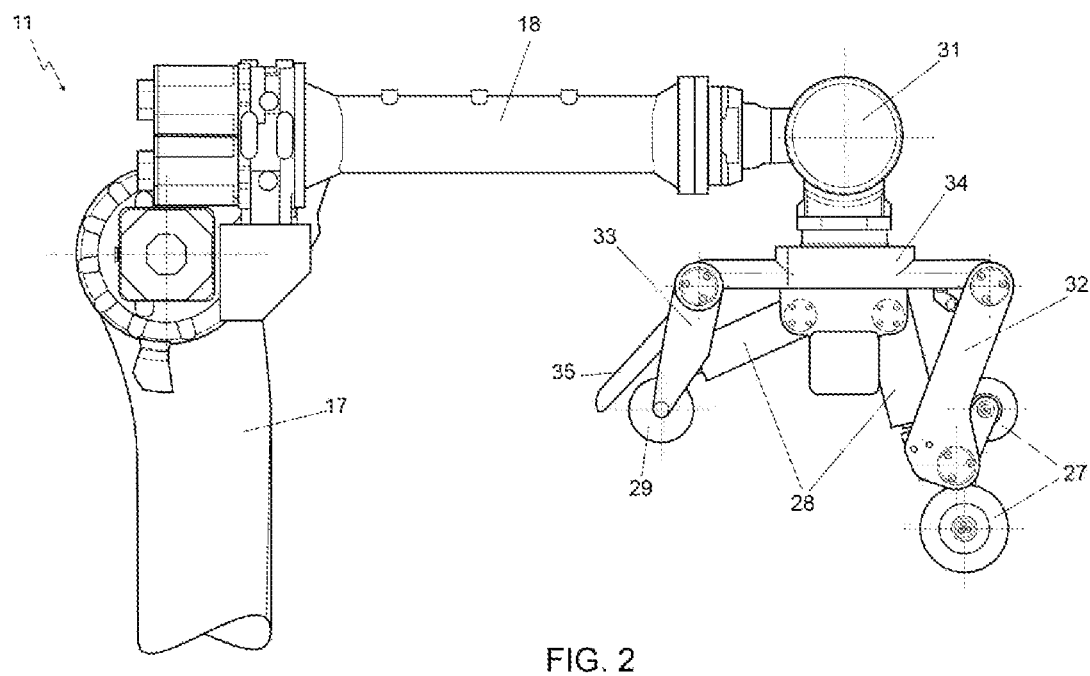
FIG. 2 shows an enlarged view of the upper part of the robot 11 and of the head 22 composed of prober and cutter means.
Figure 3:
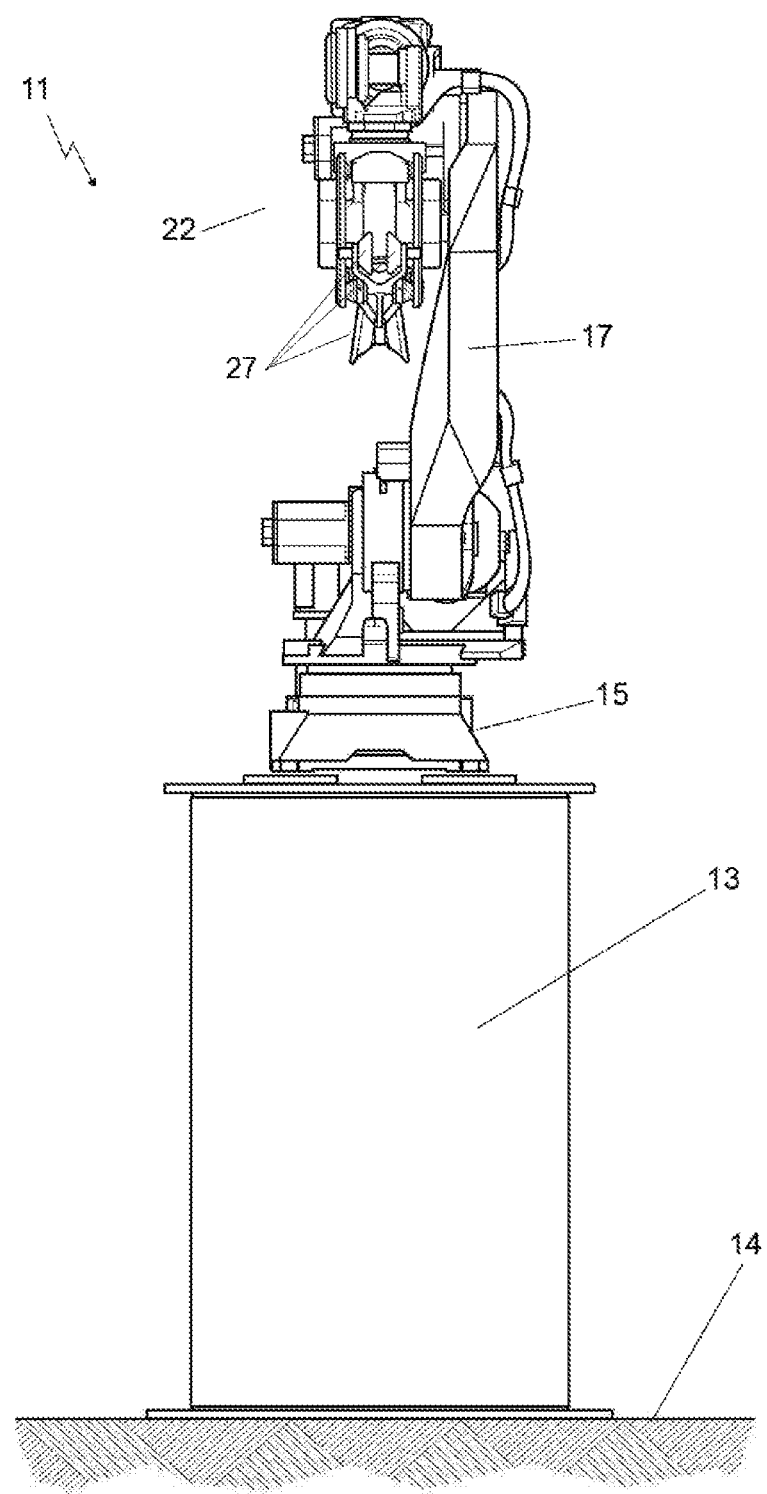
FIG. 3 shows a vertical front view of the robot 11 mounted thanks to the pedestal 13 in the ground plane 14, equipped with a head 22 acting either by means of the rollers 27, or by rotating the same 22 with the blades 35.

In other words, in order to preferably adapt to the morphology of the animal, the connecting rods 33 and 32 of the first robot 11 adapt to the rotating movement by means of the pistons 28, as can be seen in FIGS. 1 and 2.

Figure 4:
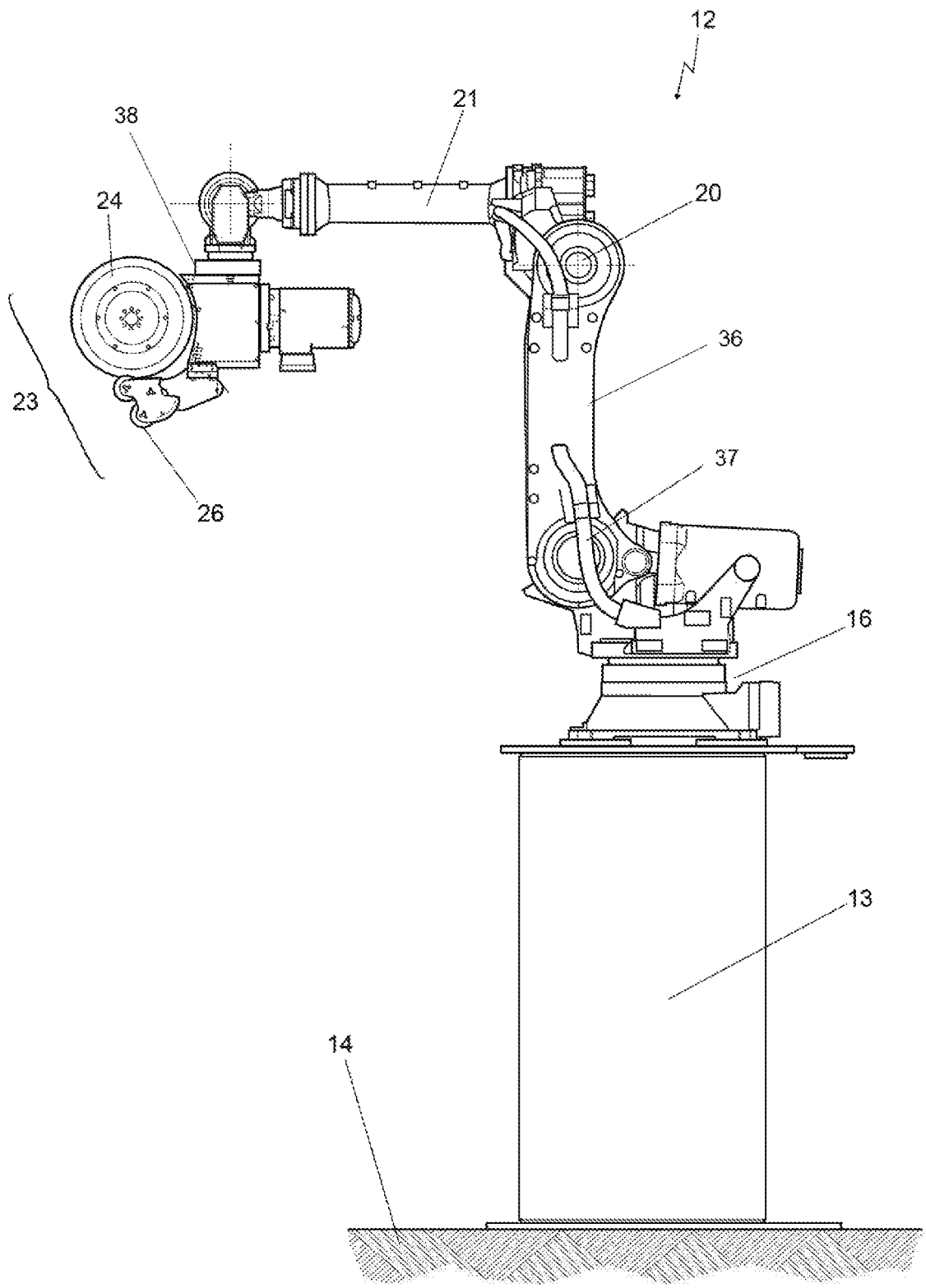
FIG. 4 shows a vertical side view of the enlarged second robot 12, equipped with a head 23, equipped with a cutting disc 24 and a prober 25, equipped with rollers 26.
Figure 5:
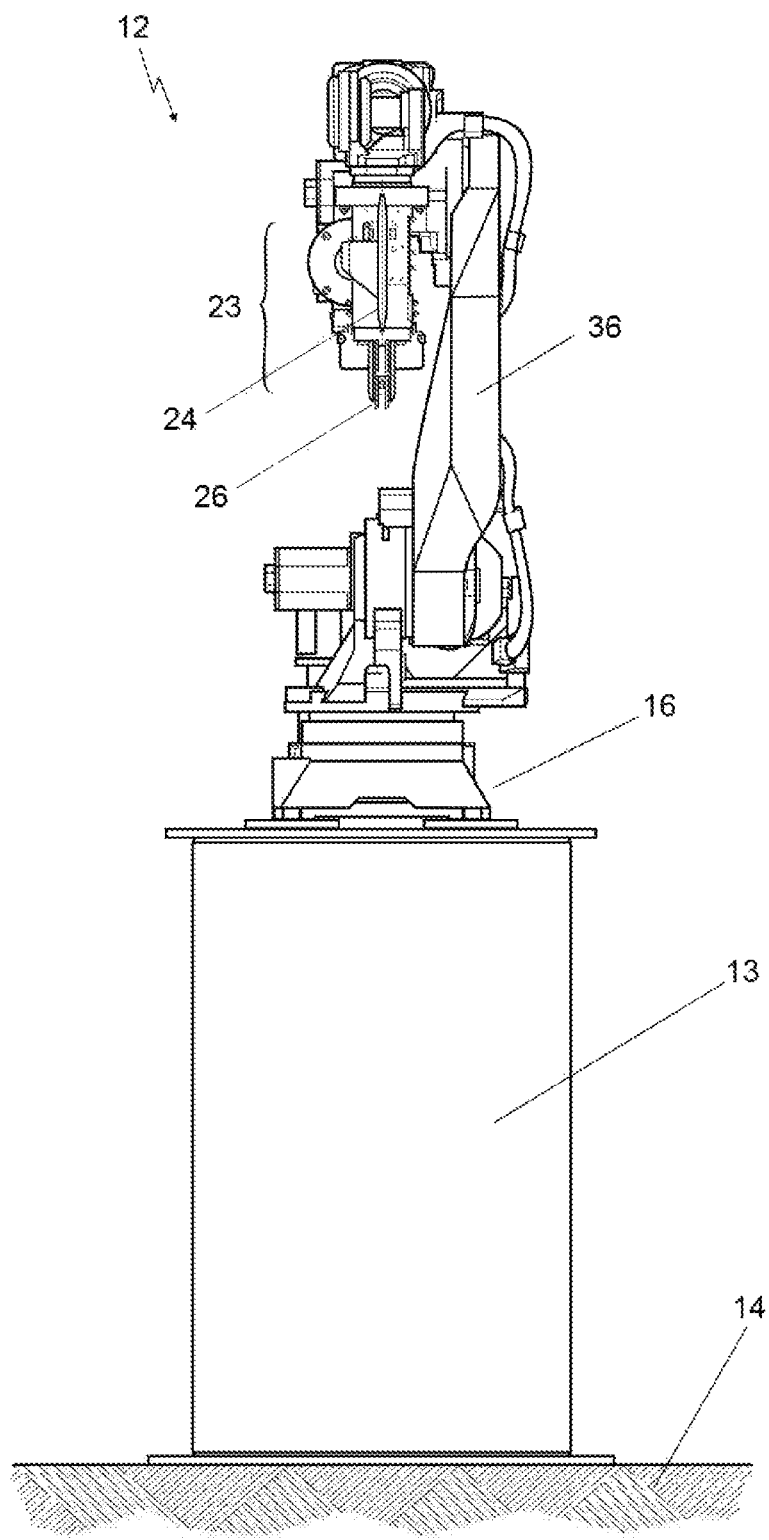
FIG. 5 shows a vertical front view of the second robot 12 and the head 23 equipped with a cutting disc 24 and a probe 25.

The second robot 12 comprises, on said pedestal 13, a support base 16 and respective arms 36, 21 linked by the respective shafts 37, 20, with a head 23, equipped with palpation and cutting means incorporated in a support 38 being mounted on the end of the arm 21, see FIG. 4.

The two robots may be used to do the following work possibilities:

The first possibility is: the first robot 11 working with the probe rollers (27), holding an animal by the dorsal part by means of the probe rollers 27 mounted on the head 22, when the second robot 12 cuts it via the ventral area by means of the cutting disc 24, in line with the morphology of the animal, thanks to the probe rollers 26.

The second possibility is: the first robot 11 turns 180° to the support 34 and, the blades 29 so that turns to work in this position with the blades 35 and 29, acting on the dorsal part of the animal, cutting the skin and cleaning the meat from the intervertebral areas, while the head 23 of the second robot 12 performs a cut in the spine for the ventral part, helping by the probe rollers 25, 26.

With this device, the possibilities for manipulating the animals that circulate through the carousel in the space between the two robots 11 and 12 are those described in the previous paragraph, by simply programming the position of the head 22 so that it acts as a guide and supports the robot 12 when it cuts the animal ventrally in two, or when the animal is dorsally and ventrally cut simultaneously. While at present in order to exercise the functions tasked to the robot 11 three robots would be required, resulting in a longer time and an additional robot, and more energy to provide electromotive force to three robots, the device described in the invention only needs two robots, plus a maintenance greater than 50% corresponding to the additional robot that is used in related devices known and used up to the present.

Having sufficiently described the present invention in correspondence with the appended figures, it is easy to remember that any detail modifications that may be appropriate may be introduced therein, provided that these do not alter the essence of the invention summarised in the following claims.

The invention claimed is:

1. A device having a plurality of robots locatable in proximity to an animal carcass for performing frontal and dorsal cutting of an animal carcass suspended from a carousel, the device comprising:
   a first robot arranged to be placed opposite a dorsal plane of an animal carcass, the first robot comprising:
      a dorsal probe roller (27) arranged to adapt to a dorsal morphology of the animal carcass;
      a first dorsal blade (35) arranged to cut skin and tissue on a dorsal portion of the animal carcass;
      a second dorsal blade (29) arranged to dorsally cut and clean meat from the animal carcass in an intervertebral space;
      an articulated arm (17, 18) arranged to position and move the first dorsal blade (35) to cut skin and tissue on the dorsal portion of the animal carcass and the second dorsal blade (29) arranged to dorsally cut and clean meat from the animal carcass in the intervertebral space;
      a dorsal probe cutter head (22) mounted on an end of the articulated arm (17, 18),
      wherein the dorsal probe cutter head (22) includes a support (34); and
   a second robot (12) arranged to be placed opposite a ventral plane of the animal carcass, comprising:
      a ventral probe roller (26) arranged to adapt to a ventral morphology of the animal carcass;
      a ventral blade (24) arranged to cut a spine of the animal carcass at a central part; and
      an articulated arm (21, 36) arranged to position and move the ventral probe roller (26) and the ventral blade (24),
   wherein the articulated arm (17, 18) of the first robot (11) is arranged to move substantially with the articulated arm (21, 26) of the second robot (12), and
   wherein the support (34) of the dorsal probe cutter head is arranged to rotate and position at least one of the dorsal probe roller (27) and the first dorsal blade and the second dorsal blade (35, 29).

2. The device in claim 1, wherein at least one of the first robot (11) and the second robot (12) has six degrees of freedom.

3. The device in claim 1, wherein the dorsal probe roller (27) comprises at least one pair of rollers arranged to tilt and move along a dorsal morphology as the animal carcass is severed.

4. The device in claim 1, wherein the dorsal probe cutter head (22) comprises a connecting rod (32) and a piston (28), and wherein connecting rod and the piston are arranged to move the dorsal probe roller (27).

5. The device in claim 4, wherein dorsal probe roller (27) is arranged to pivotally attach to the connecting rod (32).

6. The device in claim 1, wherein the articulated arm (17, 18) of the first robot (11) comprises a lower arm (17) and an upper arm (18) angled by a lower shaft (30) and an upper shaft (19), respectively.

7. The device in claim 6, wherein the connecting rod (32, 33) with the at least one of the first dorsal blade (35) and the second dorsal blade (29) is arranged to move with the morphology of the animal carcass automatically.

8. The device in claim 1, wherein the dorsal probe cutter head (22) comprises a connecting rod (32, 33) arranged to attach to at least one of the first dorsal blade (35) and the second dorsal blade (29).

9. The device in claim 1, wherein at least one of the first dorsal blade (35) and the second dorsal blade (29) comprises a circular blade.

10. The device in claim 1, wherein the dorsal probe cutter head (22) comprises the first dorsal blade (35) and the second dorsal blade (29) and the dorsal probe roller (27).

11. The device in claim 1, wherein the dorsal probe cutter head (22) is arranged to move or rotate for palpation and cutting by selective and automatic programming.

12. The device in claim 1, wherein the second robot (12) comprises a ventral probe cutter head (23), and wherein the articulated arm (21, 26) of the second robot (12) comprises a lower arm (36) and an upper arm (21), with the upper arm (21) being arranged to attach to the ventral probe cutter head (23).

13. The device in claim 12, wherein the ventral probe cutter head (23) comprises at least one of the ventral probe roller (26) and the ventral blade (24).

14. The device in claim 1, wherein the ventral probe roller (26) and the ventral blade (24) are arranged to adjust with the morphology of the animal carcass automatically.

15. The device in claim 1, wherein said support (34) is arranged to rotate 180° such that the dorsal probe cutter head (22) is in one of two positions, including a first position wherein the first dorsal blade is arranged to be located proximate to the animal carcass and a second position wherein the second dorsal blade is arranged to be located proximate to the animal carcass.

16. A device having a plurality of robots locatable in proximity to an animal carcass for performing frontal and dorsal cutting of an animal carcass suspended from a carousel, the device comprising:
a first robot equipped with a dorsal probe cutter head (22) arranged to be placed opposite a dorsal plane of an animal carcass, the first robot comprising:
a dorsal probe roller (27) arranged to adapt to a dorsal morphology of the animal carcass;
a first dorsal blade (35) arranged to cut skin and tissue on a dorsal portion of the animal carcass;
a second dorsal blade (29) arranged to dorsally cut and clean meat from the animal carcass in an intervertebral space;
an articulated arm (17, 18) arranged to position and move the first blade (35) to cut skin and tissue on the dorsal portion of the animal carcass and the second blade (29) to dorsally cut and clean meat from the animal carcass in the intervertebral spaces; and
a support (34) arranged to attach an end of the articulated arm (17, 18); and
a second robot (12) arranged to be placed opposite a ventral plane of the animal carcass, comprising:
a ventral probe roller (26) arranged to adapt to a ventral morphology of the animal carcass;
a ventral blade (24) arranged to cut a spine of the animal carcass at a central part; and
an articulated arm (21, 36) arranged to position and move the ventral probe roller (26) and the ventral blade (24).

17. The device in claim 16, wherein at least one of the first robot (11) and the second robot (12) has six degrees of freedom.

18. The device in claim 16, wherein the dorsal probe roller (27) comprises at least one pair of rollers (27) arranged to tilt and move along a dorsal morphology as the animal carcass is severed.

19. The device in claim 16, wherein the dorsal probe cutter head (22) comprises the dorsal probe roller (27), the first dorsal blade (35), and the second dorsal blade (29), and the dorsal probe cutter head (22) further comprises:
a first connecting rod arranged to connect between said support (34) and the first dorsal blade (35);
a second connecting rod arranged to connect between said support (34) and the second dorsal blade (29); and
a piston arranged to attach to one of the first connecting rod and the second connecting rod.

20. A device having a plurality of robots locatable in proximity to an animal carcass for performing frontal and dorsal cutting of an animal carcass suspended from a carousel, including a robot (12) having a ventral probe roller (26) and ventral blade (24) arranged to be placed opposite a ventral plane of the animal carcass, the device comprising:
a robot arranged to be placed opposite a dorsal plane of an animal carcass, the first robot comprising:
a dorsal probe roller (27) arranged to adapt to a dorsal morphology of the animal carcass;
a first dorsal blade (35) arranged to cut skin and tissue on a dorsal portion of the animal carcass;
a second dorsal blade (29) arranged to cut and clean meat from the animal carcass in an intervertebral space;
an articulated arm (17, 18) arranged to position and move the first blade (35) to cut skin and tissue on the dorsal portion of the animal carcass and the second blade (29) to cut and clean meat from the animal carcass in the intervertebral space; and
a support (34) arranged to attach to the dorsal probe roller (27), the first dorsal blade (35), the second dorsal blade (29) and the articulated arm, wherein the support is arranged to rotate to selectively position either the dorsal probe roller (27) or the first dorsal blade (35) proximate to the animal carcass.

* * * * *